United States Patent [19]

Balzano et al.

[11] Patent Number: 5,239,544

[45] Date of Patent: Aug. 24, 1993

[54] CONVERTER FOR INTERCONNECTING AN ASYNCHRONOUS TELECOMMUNICATION NETWORK AND A SYNCHRONOUS NETWORK

[75] Inventors: Jean-Michel Balzano, Perros-Guirec; Alain Le Bouffant, Lannion, both of France

[73] Assignee: Alcatel Cit, Paris, France

[21] Appl. No.: 627,097

[22] Filed: Dec. 13, 1990

[30] Foreign Application Priority Data

Dec. 13, 1989 [FR] France ................ 89 16497

[51] Int. Cl.⁵ .................. H04Q 11/04; H04L 12/66
[52] U.S. Cl. .................. 370/94.2; 370/60.1
[58] Field of Search ............. 370/94.2, 94.1, 60, 370/60.1, 77, 79, 84, 110.1, 95.1, 94.3; 365/230.05, 230.09, 221

[56] References Cited

U.S. PATENT DOCUMENTS

| | | | |
|---|---|---|---|
| 4,541,076 | 9/1985 | Bowers et al. | 365/230.05 |
| 4,612,636 | 9/1986 | Grover et al. | 370/94.1 |
| 4,761,781 | 9/1988 | Calvaniac et al. | 370/94.2 |
| 4,805,167 | 2/1989 | Leslie et al. | 370/110.1 |
| 4,808,008 | 2/1989 | Guerillot | 370/84 |
| 4,893,303 | 1/1990 | Chao et al. | 370/84 |
| 5,008,878 | 4/1991 | Ahmadi et al. | 370/94.3 |

*Primary Examiner*—Douglas W. Olms
*Assistant Examiner*—H. Kizou
*Attorney, Agent, or Firm*—Sughrue, Mion, Zinn, Macpeak & Seas

[57] ABSTRACT

The converter comprises a memory (SRAM) having first and second ports, a first port management circuit (SPM) connected to the first port, to an incoming synchronous multiplex line (ME) and to an outgoing synchronous multiples line (MS), and a second port management circuit (APM) connected to the second port, to an incoming asynchronous link (LE) via an FIFO type packet memory (M) and to an outgoing asynchronous link (LS). An external command (MF) applied to the port management circuits selects the converter operating mode; in a first mode (M32) each time slot of a frame of a synchronous multiplexed signal is assigned to one communication channel and in a second mode (M1) all the time slots of a synchronous frame are assigned to one channel.

3 Claims, 3 Drawing Sheets

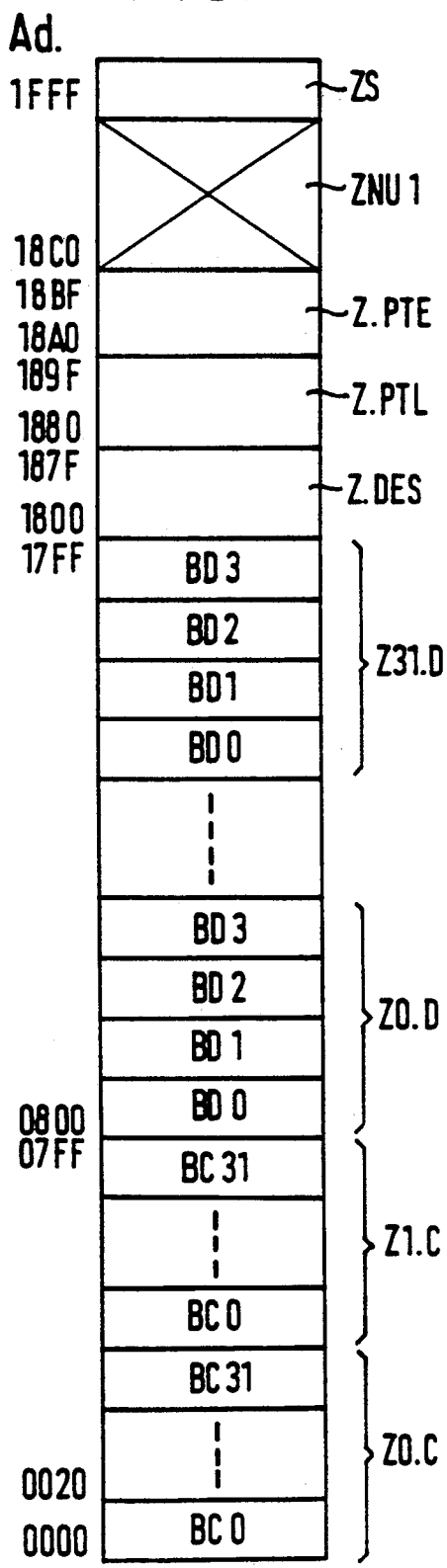
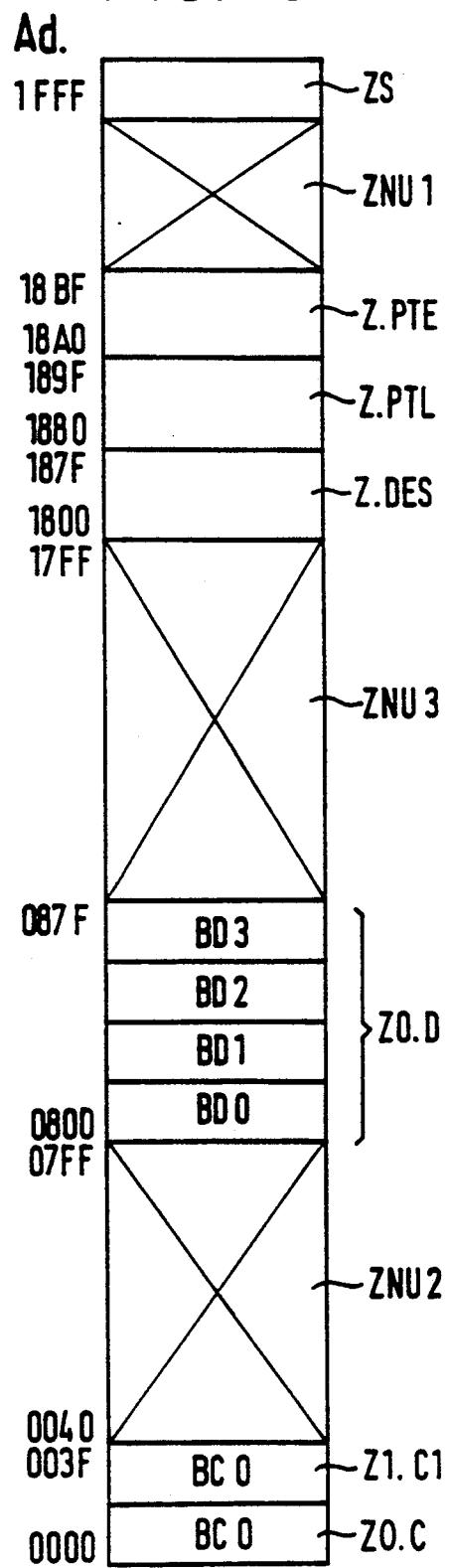

FIG. 3
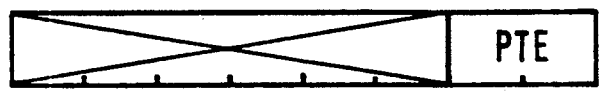
FIG. 4
FIG. 5
FIG. 6
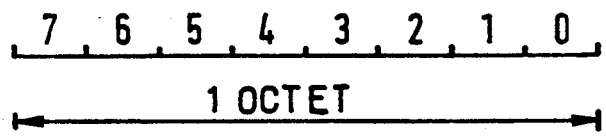
FIG. 7
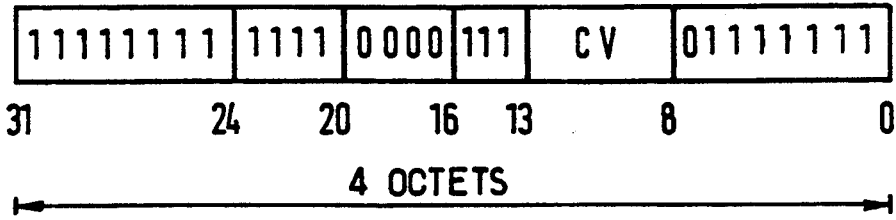

CONVERTER FOR INTERCONNECTING AN ASYNCHRONOUS TELECOMMUNICATION NETWORK AND A SYNCHRONOUS NETWORK

BACKGROUND OF THE INVENTION

The present invention concerns the field of telecommunications and enables the connection of switching systems based on the ATM (Asynchronous Transfer Mode) technique to systems based on the STM (Synchronous Transfer Mode) technique. The progressive introduction of ATM type switches into the current network means that they must be able to work with STM type switches.

The STM technique is characterized by the multiplexing of several calls at 64 kbit/s onto the same PCM frame. The frame is subdivided into 32 time slots TS0 through TS31. Each TS is reserved for a specific call and has a data rate of 64 kbit/s. The start of the frame is identified by a known synchronization pattern included in TS0.

The ATM technique is characterized by the multiplexing onto a common medium of packets made up of, for example, 36 bytes identified by a header on 4 bytes and having a useful content of 32 bytes. A given header represents a given call. The data rate of the medium is independent of that of the calls that it carries.

Synchronous-asynchronous conversion of a PCM frame therefore involves:

In the Synchronous to Asynchronous direction:
storing 32 bytes of each channel to form the useful content of the packets,
adding to each packet a header specific to each channel,
multiplexing the various packets onto a common medium,
In the Asynchronous to Synchronous direction:
identifying the channel by analyzing the header of the received packet,
storing the useful content of the packets received,
reading a byte in the memory and transmitting it on the PCM in each TS·time.

The usual synchronous-asynchronous conversion systems convert a single digital channel, at low or high data rate, and include a packetizer and a depacketizer. The packetizer assembles a packet from the digital bit stream by counting incoming bits or bytes and then adds a label which identifies the service. The depacketizer carries out the converse operation and reconstitutes a recurrent bit stream from the information contained in the packets with the same label.

SUMMARY OF THE INVENTION

An object of the invention is to provide a synchronous-asynchronous and asynchronous-synchronous converter adapted to packetize an incoming synchronous multiplexed signal by assigning either a virtual circuit number to each time slot of the frames of said synchronous multiplexed signal or a virtual circuit number to the 32 time slots of a frame, and adapted to assemble into synchronous frames the packets of an incoming asynchronous multiplex signal.

The invention comprises a synchronous-asynchronous, and vice versa, converter connected to a synchronous network in which information is carried by frame structured synchronous multiplexed signals in which each frame is divided into 32 time slots assigned to at least one communication channel and to an asynchronous network in which information is carried by packets having a header and a usable part of 32 bytes, characterized in that it comprises a random access memory having a first port and a second port, a first port management circuit connected to the first port and to an incoming synchronous multiplex line carrying an incoming synchronous multiplexed signal, and to an outgoing synchronous multiplex line carrying an outgoing synchronous multiplexed signal, said incoming and outgoing synchronous multiplexed signals being frame structured multiplexed signals, and a second port management circuit connected to the second port and to an incoming asynchronous multiplex link and to an outgoing asynchronous multiplex link each carrying an asynchronous multiplexed signal made up of packets each relating to one channel, in that, in the synchronous network to asynchronous network direction, the first port management circuit stores in the memory at least 32 bytes of each channel, the second port management circuit reading the memory to assemble the stored data into a packet and transmitting the packets on the outgoing asynchronous link and in that, in the asynchronous network to synchronous network direction, the second port management circuit stores in the memory at least one packet received on the incoming asynchronous link, the first port management circuit reading the memory to transmit frames on the outgoing synchronous multiplex link.

BRIEF DESCRIPTION OF THE DRAWINGS the invention will be clearly understood from the following description of typical embodiments shown in the appended Figures in which:

FIG. 1 is a schematic representation of a synchronous-asynchronous converter in accordance with the invention, FIGS. 2A and 2B show the organization of a double-ported memory from FIG. 1, FIG. 2A relating to an M32 operating mode and FIG. 2B relating to an M1 operating mode, FIG. 3 shows the format of a memory semaphore word, FIG. 4 shows the format of a memory write pointer, FIG. 5 shows the format of a memory read pointer, FIG. 6 shows the format of a memory descriptor, FIG. 7 shows the format of the header of the packets transmitted by the converter.

DESCRIPTION OF THE PREFERRED EMBODIMENT

Figure 1:
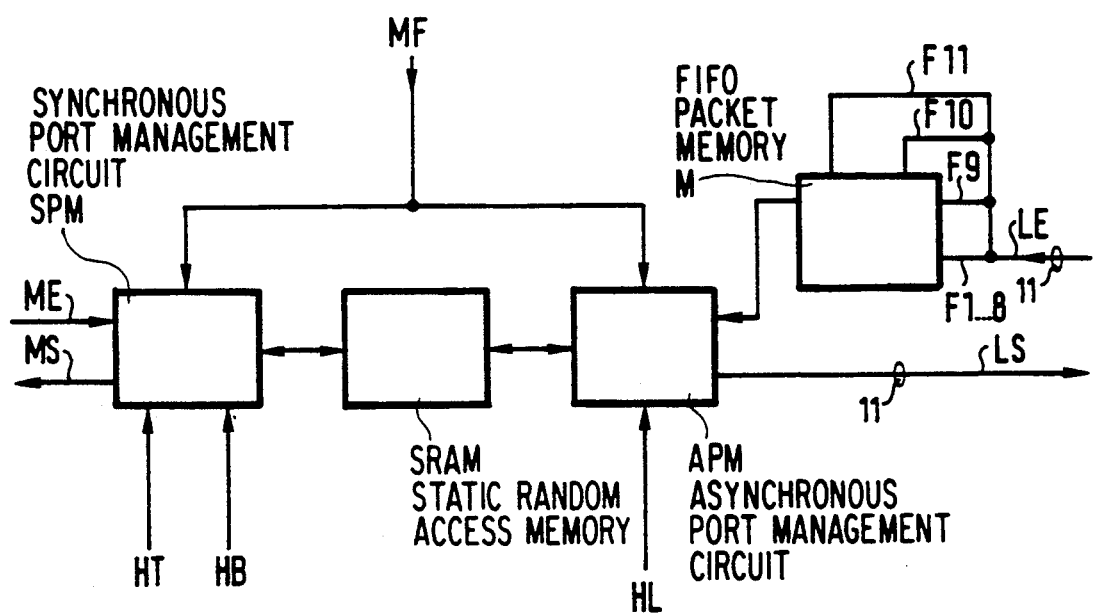

FIG. 1 is a schematic representation of the synchronous/asynchronous converter in accordance with the invention comprising a double-ported random access memory (SRAM) having a synchronous first port and an asynchronous second port, a synchronous port management circuit SPM, an asynchronous port management circuit APM, and an FIFO-type packet memory M.

The synchronous port management circuit SPM is connected to an incoming synchronous multiplex line ME and to an outgoing synchronous multiplex line MS; it is also connected to the synchronous port of the double-ported memory SRAM: it receives a frame clock signal HT and a bit clock signal HB from a clock recovery device (not shown) connected to the incoming multiplex line ME.

The asynchronous port management circuit APM is connected to the asynchronous port of the double-ported memory SRAM and directly to an outgoing asynchronous link LS and via the packet memory M to an incoming asynchronous link LE; it receives a clock signal HL from a local clock (not shown). The incoming and outgoing asynchronous links are parallel links each with 11 lines: eight bit lines for data, a packet start line at 0 at the start of a packet, that is to say at the first byte of the full packet, a full packet line at 0 throughout the duration of a full packet, and a byte clock signal line at the asynchronous link data rate.

The packet memory M is connected at the input to the incoming asynchronous link LE and at the output to the management circuit APM. The packet memory M is nine bits wide, with eight bits connected to the eight bit lines F1/8 and the ninth bit connected to the packet start line F9; a write enable input is connected to the full packet line F10 to enable incoming full packets to be stored and a write input is connected to the clock signal line F11. The packet memory M forms a buffer for reducing the binary data rate received on the incoming asynchronous link LE to make it compatible with the processing speed of the second port management circuit APM; the memory M contains only full packets.

The synchronous port management circuit SPM and the asynchronous port management circuit APM are each in the form of a programmable array of logic gates, for example the XILINX XC 3090 component; this is a standard component which is customized by programming a static memory internal to the component when the converter is initialized.

The converter in accordance with the invention has two operating modes, selected by an external command MF operative on the management circuits SPM and APM. In a first operating mode, hereinafter referred to as the M32 mode, a virtual circuit number is assigned to each time slot of a frame. In a second operating mode, referred to hereinafter as the M1 mode, a virtual circuit number is assigned to the 32 time slots of a frame of the synchronous multiplexed signal.

The memory SRAM comprises 8,192 words of one byte and FIGS. 2A and 2B show the organization of the memory in M32 mode and in M1 mode, respectively. In these FIGURES the byte addresses Ad are in hexadecimal, the address 0000 being that of the first byte and the address 1FFF being that of the 8 192nd byte of the memory.

FIG. 2A shows successively, from the first byte, a first packetizer area Z0.C, a second packetizer area Z1.C, 32 depacketizer areas Z0.D through Z31.D, a descriptors area Z.DES, a read pointers area Z.PTL, a write pointers area Z.PTE, an unused area ZNU1 and a semaphore area ZS.

The packetizer areas Z0.C and Z1.C each comprise 32 packetizer blocks BC0 through BC31, each comprising 32 bytes. The start and end addresses of the combination of these two areas are respectively 0000 and 07FF.

The depacketizer areas Z0.D through Z31.D each comprise four depacketizer blocks BD0 through BD3 each comprising 32 bytes. The start and end addresses of the set of 32 areas are respectively 0800 and 17FF.

The descriptors area Z.DES comprises 128 descriptors each of one byte; the start and end addresses of this area are respectively 1800 and 187F.

The read pointers area Z.PTL comprises 32 read pointers each of one byte; the start and end addresses of this area are respectively 1880 and 189F.

The write pointers area Z.PTE comprises 32 write pointers each of one byte; the start and end addresses of this area are respectively 18A0 and 18BF.

The unused area ZNU1 comprises 1,855 bytes

The semaphore area is one byte at the address 1FFF; this is the last byte of the memory.

FIG. 2B shows successively, from the first byte at address 0000, a first packetizer area Z0.C1, a second packetizer area Z1.C1, an unused area ZNU2, a depacketizer area Z0.D, an unused area ZNU3, a descriptor area Z.DES, a read pointer area Z.PTL, a write pointer area Z.PTE, an unused area ZNU1, and a semaphore area ZF.

The packetizer areas Z0.C1 and Z1.C1 each comprise a block BC0 of 32 bytes. The start and end addresses of the combination of these two areas are respectively 0000 and 003F.

The unused area ZNU2 comprises 1,984 bytes and ends at the address 07FF which is equivalent to the end of the second packetizer area Z1.C in FIG. 2A.

As in FIG. 2A, the depacketizer area Z0.D comprises four depacketizer blocks BD0 through BD3. The start and end addresses of this area are respectively 0800 and 087F. The start and end addresses are the same as those of the depacketizer block Z0.D in FIG. 2A.

The unused area ZNU3 comprises 3,968 bytes and ends at the address 17FF which is equivalent to the end of the packetizer area Z31.D in FIG. 2A; this unused area is equivalent to the depacketizer areas Z1.D through Z31.D in FIG. 2A.

The descriptor area Z.DES comprises 128 bytes, only the first four of which are used; as in FIG. 2A, the start and end addresses of this area are respectively 1800 and 187F.

The read pointer area Z.PTL comprises 32 bytes of which only the first is used; as in FIG. 2A, the start and end addresses of this area are respectively 1880 and 189F.

The write pointer area Z.PTE comprises 32 bytes of which only the first is used; as in FIG. 2A, the start and end addresses of this area are respectively 18A0 and 18BF.

The unused area ZNU1 is identical to that from FIG. 2A.

The semaphore area ZS is identical to that from FIG. 2A; the byte constituting it also has the address 1FFF.

FIG. 3 shows the structure of the byte constituting the semaphore area ZS from FIGS. 2A and 2B. This byte is used for dialog between the synchronous port management circuit SPM and the asynchronous port management circuit APM, and only the least significant bit S is used. The S bit is set by the circuit SPM; it goes to logic "0" when the packetizer area Z0.C or Z0.C1 of the memory SRAM is completely filled and to logic "1" when the packetizer area Z1.C or Z1.C1 of the memory SRAM is completely filled; the S bit is used by the APM circuit.

FIG. 4 shows the structure of a write pointer consisting of one byte and used by the circuit APM to assign blocks of each depacketizer area Z0.D through Z31.D. There is a write pointer for each depacketizer area to indicate the block of said area in which the next packet arriving on the channel corresponding to said block will be stored. In the byte of a write pointer only bits 0 and 1 (PTE) are used to indicate the number of the block in which to store the content of a packet received by reading the packet memory M.

FIG. 5 shows the structure of a read pointer consisting of one byte and used by the circuit SPM to identify the byte to read in each depacketizer area. There is a write pointer for each depacketizer area to indicate the byte which is to be transmitted on the outgoing synchronous multiplex line MS. In the byte of a read pointer bits 0 through 6 (PTL) indicate the number of the byte to transmit on the outgoing synchronous multiplex line MS; bit 7 of the byte is not used.

FIG. 6 shows the structure of a descriptor consisting of one byte and used to determine the occupancy of the depacketizer area blocks. There is one descriptor for each block, and therefore 128 descriptors in total. A descriptor indicates the state (free or busy) of a block. In the byte of a descriptor only bit 0 (D) is used. The D bit has the value 0 to indicate that a block is free or the value 1 to indicate that a block is busy.

The packetizers and depacketizers operate totally asynchronously. Conflicts for access to the double ported memory SRAM are resolved by working on areas reserved for reading or for writing. The synchronous port management circuit SPM writes in the packetizer direction (incoming synchronous multiplex line ME to outgoing asynchronous link LS) and reads in the depacketizer direction (incoming asynchronous link LE to outgoing synchronous multiplex line MS). The asynchronous port management circuit APM reads in the packetizer direction and writes in the depacketizer direction.

For packetization in M32 mode the converter uses the packetizer areas Z0.C and Z1.C and the semaphore area ZS, FIG. 2A, which for this mode constitutes the packetizer part of the memory SRAM. Each byte of a given packetizer area is associated with one of the 32 channels to be assembled into packets.

In practice block contains the data from 32 time slots TS0 through TS31 of an incoming synchronous multiplex frame; consequently, there are always 64 frames stored in the memory SRAM by the circuit SPM. Storage in the two packetizer areas is of the circulating buffer type. The packetization functions implemented by the circuit SPM are:

reception of the incoming synchronous multiplexed signal, carried by the incoming synchronous multiplex line ME, parallelization, time slot by time slot, of the eight bits of each time slot; the first bit received is the most significant bit and the last bit received is the least significant bit, writing in the memory SRAM, respecting the TS order. The circuit SPM includes an address counter, modulo 2,048, synchronized by the frame clock signal HT to guarantee that the integrity of a received block is retained in the block where it is stored. The successive TS are written at increasing addresses, TS0 first and TS31 last. A given address always contains a TS of the same rank. The memory SRAM is written at the clock rate of the incoming synchronous multiplexed signal that is to say a block every 125 microseconds and an area every 4 milliseconds. The last 64 frames received are always stored in the memory SRAM; the next write at the same address will take place 64 frames (8 ms) later, writing the semaphore byte ZS of the memory SRAM when filling of this area is completed. It contains the number, 0 or 1, of the packetizer area in which the circuit SPM is not working. This area release indication is used by the circuit APM to transmit the corresponding packets to the free packetization area.

The circuit APM includes a TS counter and a block counter which it uses for packetizing. The TS counter indicates the number of the channel currently being assembled into a packet and the block counter indicates the number of the packetizer block currently being assembled into a packet. In M32 mode both these counters are modulo 32 counters. The block counter is incremented after reading one byte of a block and the TS counter is incremented after reading 32 bytes, that is to say after reading one byte from each of the 32 blocks of a packetizer area.

The packetization functions implemented by the APM circuit in M32 mode are described below, and it must be borne in mind that each packetizer area Z0.C and Z1.C comprises 32 blocks and that each block contains one byte of each of the channels to be assembled into a packet; consequently, a full area contains 32 useful bytes of each channel, that is to say the content of a packet of each channel. After a packetization operation the circuit APM reads the semaphore byte and if the S bit of the semaphore byte has changed state the APM circuit stores the new value of the S bit and the packetization operations in the packetizer area indicated by the S bit begin.

With the TS and block counters at 0, the APM circuit:

sends, on the outgoing asynchronous link LS, a header on four bytes, FIG. 7, which corresponds to channel TS0 for which the data is stored in byte 0 of each block of the packetization area, reads in the memory SRAM and sends on the outgoing asynchronous link LS, byte 0 of the packetizer area block BC0, increments the block counter which then indicates the block BC1 of the packetizer area, and reads and sends on the link LS the byte 0 of the block BC1, and so on until it reads byte 0 of block BC31 of the packetizer area, increments the TS counter which then indicates TS1, the operations just described for TS0 being repeated for each of the 31 remaining channels. When byte 31 of BC31 of the packetizer area is read and sent on the outgoing synchronous link LS, the TS counter and the block counter are at 0 and the circuit APM scans the semaphore byte to detect any change of state of the S bit; if the state has not changed the APM circuit sends empty packets on the link LS.

FIG. 7 shows the structure of the header; in the field reserved for the virtual circuit number, bits 8 through 15, only the three less significant bits 8 through 13 (CV) are used by the circuit APM. These five bits represent the number of the TS used; for TS0 the virtual circuit (CV) indication is 00000 and for TS31 the virtual circuit (CV) indication is 11111.

The speed at which the circuit APM operates is chosen so that an area is completely assembled into a packet in less time than it takes to fill it by the circuit SPM. Consequently, when packetization of the 32 channels has been completed, the circuit APM scans the semaphore byte to detect any further change in the state of the S bit; if the S bit has not changed state, the circuit APM transmits empty packets on the outgoing asynchronous link LS.

For packetization in M1 mode the converter uses the packetizer areas Z0.C1 and Z1.C1 and the semaphore area ZS, FIG. 2B, which for this mode constitutes the packetizer part of the memory SRAM. Each packetizer area is reduced to a single block, BC0, which contains 32 bytes numbered from 0 through 31 constituting the useful content of the channel to be assembled into a packet. The structure and the use of the semaphore byte are exactly the same as in the M32 operating mode previously described.

The operation of the circuit SPM is exactly the same as that described for the M32 mode; however, only the last two frames of the incoming synchronous multiplexed signal are stored in the memory SRAM, each block of two assembler areas containing one frame. The next write at the same address will therefore take place two frames (250 microseconds) later; in M1 mode the address counter of the circuit SPM is a modulo 64 counter.

As in M32 mode, packetization begins when the circuit APM detects the change of state of the S bit of the byte and semaphore. In this M1 mode, the TS counter of the circuit APM is still a modulo 32 counter, but as each packetizer area comprises only one block, the APM circuit block counter is locked at 0 in M1 mode. As soon as the circuit APM detects that the state of the S bit has changed:

- it sends on the outgoing asynchronous link LS a header of four bytes whose structure is exactly the same as that of the header described for the M32 mode and shown in FIG. 7; in the M1 mode, as only one channel is packetized the virtual circuit (CV) indication is 00000,
- it reads in the memory SRAM and sends on the outgoing asynchronous link LS the 32 bytes of the packetizer area block indicated by the S bit. The bytes are read in the block in the same order as they are written, that is to say with the byte in TS0 first.

As in the M32 operating mode, the speed at which the circuit APM operates is chosen so that the time to assemble a packetizer area into a packet is less than the time taken to fill it by the circuit SPM.

For depacketization in M32 and M1 modes the converter uses the FIFO-type packet memory M in which the incoming packets are stored.

The memory M is emptied by the asynchronous port management circuit APM which has its own packet clock signal obtained by dividing down the clock signal HL provided by the local clock.

To empty the memory M correctly, the management circuit APM must read the first byte of a packet in the memory M on a transition of the packet clock signal; to this end the memory M is nine bits wide, providing eight bits for storing the packet data and a ninth bit for indicating the start of a packet; the ninth bit is set to 0 when the first byte of a packet is stored in the packet memory M. The synchronization process is as follows:

- the memory M is systematically read on the packet clock signal transitions,
- if the ninth bit read is set, then synchronization is effective, the management circuit APM reads and processes the remaining 35 bytes of the packet,
- if the ninth bit is not set, the packet memory M is not read.

For depacketization in M32 mode the converter uses the depacketizer areas Z0.D through Z31.D, the descriptor area Z.DES, the read pointer area Z.PTL and the write pointer area Z.PTE of the memory SRAM, FIG. 2A, which, for the M32 mode, constitute the depacketizer part of the memory. Each depacketizer area block contains a packet to be disassembled, each area being assigned to one of the 32 channels to be disassembled. Each of the 128 descriptors is assigned to one depacketizer area block, to indicate the state of the block (free or occupied). Each of the 32 write pointers is assigned to one depacketizer area to indicate the block in which the next packet arriving on the corresponding channel will be stored. Each of the 32 read pointers is assigned to one depacketizer area. When the packet memory M is synchronized, the management circuit APM performs the following functions:

- it reads the header of a received packet and stores internally the virtual circuit number included in the header; the five less significant bits of the virtual circuit number indicate, in binary, the number of the depacketizer area in which the circuit APM must store the useful content of the received packet,
- it reads the write pointer of said area, which indicates the number of the block in which the useful content of the received packet is to be stored,
- it stores the useful content of the packet in the block, byte by byte, at increasing addresses,
- it sets the block descriptor to 1,
- it increments by one unit modulo 4 the write pointer of the area in which the packet is stored.

For depacketization the synchronous port management circuit SPM includes a modulo 32 time slot counter and a modulo 32 area counter used in both modes M32 and M1, the area counter being locked at 0 in the M1 mode as there is only one depacketizer area in this mode. The time slot counter is synchronized by the frame clock signal HT, FIG. 1. In M32 mode the area counter is incremented at the clock rate of the time slot counter.

In M32 mode the circuit SPM implements the following functions:

- it reads the read pointer corresponding to the area indicated by the area counter,
- it reads the descriptor of the block corresponding to the read pointer, to determine the state of the block, empty or not empty; the block number is obtained by dividing by 32 the number contained in the read pointer,
- if the block is full, it reads the byte given by the read pointer and increments the block read pointer; if the block is not completely read, it reads the read pointer corresponding to a new time slot; if the block is completely read, it sets the descriptor to 0 and reads the read pointer corresponding to a new time slot indicated by the time slot counter,
- if the block is not full, it transmits an idle code of one byte on the outgoing synchronous multiplexed line.

For depacketization in M1 mode the converter uses the depacketizer area Z0.D, the descriptor area Z.DES, the read pointer area Z.PTL and the write pointer area Z.PTE of the memory SRAM, FIG. 2B, which for the M1 mode constitutes the depacketizer part of the memory. Each block of the depacketizer area contains one packet to be disassembled, each block being assigned to one channel to be disassembled.

The functions implemented by the management circuit APM are the same as those described for depacketization in M32 mode. Note that in M1 mode there is only one depacketizer area Z0.D and that each packet received contains the 32 time slots of one channel, and therefore of one frame of the outgoing synchronous multiplex. The virtual circuit number always indicates the same area, Z0.D; there is therefore only one write pointer to indicate the block in which to store the content of the received packet and four descriptors, one for each block of the area.

The operation of the circuit SPM in M1 mode is similar to that in M32 mode; however, in M1 mode there is only one depacketizer area, Z0.D and consequently only one read pointer which is read whatever the time slot number supplied by the time slot counter of the circuit SPM. The area counter is locked at 0. The functions implemented by the management circuit SPM are:

it reads the read pointer it reads the block descriptor corresponding to the read pointer, to determine the state of a block; the same descriptor is read 32 times in succession because a descriptor is associated with a block and a block contains the data from 32 consecutive TS; the first byte of a block is read at TS=0 and the last byte at TS=32, if the block is filled, it reads the byte given by the read pointer of the block and increments the read pointer; if the block is not read completely, it reads the read pointer as soon as the time slot counter supplies a new TS number; if the block is completely read, it sets the descriptor to 0, D=0, and reads the read pointer as soon as the counter supplies a new TS number, if the block is not filled, it transmits an idle code of one byte on the outgoing synchronous multiplex line.

The synchronous-asynchronous converter in accordance with the invention is therefore able to operate in the M32 and M1 modes, the mode being selected by the external command MF. Of course, the operating mode is selected when the converter is commissioned, the command operating on the management circuits SPM and APM as previously explained in order to limit in M1 mode the packetizer and depacketizer areas used in the memory SRAM and the number of descriptors, the number of read pointers and the number of write pointers.

We claim:

1. A converter for interconnecting a synchronous network in which information is carried by frame structured synchronous multiplexed signals in which each frame is divided into 32 time slots assigned to at least one communication channel and an asynchronous network in which information is carried by packets having a header and a usable part of 32 bytes, characterized in that it comprises a dual port random access memory (SRAM) having a first port and a second port, a first port management circuit (SPM) connected to the first port and to an incoming synchronous multiplex line (ME) carrying an incoming synchronous multiplexed signal, and to an outgoing synchronous multiplex line (MS) carrying an outgoing synchronous multiplexed signal, said incoming and outgoing synchronous multiplexed signals being frame structured multiplexed signals, and a second port management circuit connected to the second port and to an incoming asynchronous multiplex link (LE) and to an outgoing asynchronous multiplex link (LS) each carrying an asynchronous multiplexed signal made up of packets each relating to one channel, in that, in the synchronous network to asynchronous network direction, the first port management circuit (SPM) stores as first data in the dual port memory (SRAM) at least 32 bytes of each channel in a first write mode, the second port management circuit (APM) reading said stored first data from the dual port memory in a first read mode to assemble the stored data into packets and transmitting the packets on the outgoing asynchronous link (LS) and in that, in the asynchronous network to synchronous network direction, the second port management circuit (APM) stores as second data in the dual port memory (SRAM) at least one packet received on the incoming asynchronous link (LE) in a second write mode, the first port management circuit (SPM) reading said stored second data from the dual port memory in a second read mode to transmit frames on the outgoing synchronous multiplex link (MS), wherein a first operating mode each time slot of a frame is assigned to one channel and that in a second operating mode all the time slots of each frame are assigned to the same channel, the operating mode being imposed by an external command (MF) applied to the first port management circuit (SPM) and to the second port management circuit (APM), and wherein in the first operating mode the dual port memory (SRAM) comprises:

two packetizer area (Z0.C, Z1.C) each of 32 packetizer blocks (BC0 through BC31) each of 32 bytes, each block containing one byte of each of 32 channels to be assembled into a packet and each packetizer area being alternately written by the first port management circuit (SPM) in said first write mode and read by the second port management circuit (APM) in said first read mode, 32 depacketizer areas (Z0.D through Z31.D) each of four depacketizer blocks (BD0 through BD3) each of 32 bytes, each depacketizer area being assigned to one channel and each block of a depacketizer area containing a packet relating to the channel of said area;

a descriptors area (Z.DES) having a descriptor of one type for each depacketizer block to indicate if the block is full or empty, a read pointer area (Z.PTL) having a read pointer of one byte for each depacketizer area to indicate in said second read mode a byte in said depacketizer area, a write pointer area (Z.PTE) having a write pointer of one byte for each depacketizer area to indicate in said second write mode a block of said area or in said second read mode a received packet relating to said depacketizer area, and a semaphore area (ZS) of one byte to indicate which packetizer area (Z0.C; Z1.C) is filled.

2. A converter for interconnecting a synchronous network in which information is carried by frame structured synchronous multiplexed signals in which each frame is divided into 32 time slots assigned to at least one communication channel and an asynchronous network in which information is carried by packets having a header and a usable part of 32 bytes, characterized in that it comprises a dual port random access memory (SRAM) having a first port and a second port, a first port management circuit (SPM) connected to the first port and to an incoming synchronous multiplex line (ME) carrying an incoming synchronous multiplexed signal, and to an outgoing synchronous multiplex line (MS) carrying an outgoing synchronous multiplexed signal, said incoming and outgoing synchronous multiplexed signals being frame structured multiplexed signals, and a second port management circuit connected to the second port and to an incoming asynchronous multiplex link (LE) and to an outgoing asynchronous multiplex link (LS) each carrying an asynchronous multiplexed signal made up of packets each relating to one channel, in that, in the synchronous network to asynchronous network direction, the first port management circuit (SPM) stores as first data in the dual port memory (SRAM) at least 32 bytes of each channel in a first write mode, the second port management circuit (APM) reading said stored first data from the dual port memory in a first read mode to assemble the stored data into packets and transmitting the packets on the outgoing asynchronous link (LS) and in that, in the asynchronous network to synchronous network direction, the second port management circuit (APM) stores as second data in the dual port memory (SRAM) at least one packet received on the incoming asynchronous link (LE) in a second write mode, the first port management circuit (SPM) reading said stored second data from the dual port memory in a second read mode to transmit frames on the outgoing synchronous multiplex link (MS), wherein in a first operating mode each time slot of a frame is assigned to one channel and that in a second operating mode all the time slots of each frame are assigned to the same channel, the operating mode being imposed by an external command (MF) applied to the first port management circuit (SPM) and to the second port management circuit (APM), and wherein in the second operating mode the dual port memory (SRAM) comprises:
   two packetizer areas (Z0.C1 and Z1.C1) each of one block (BC0) of 32 bytes, each block containing a frame to be assembled into a packet and each packetizer area being alternately written by the first port management circuit (SPM) and read by the second port management circuit (APM),
   a depacketizer area (Z0.D) of four depacketizer blocks (BD0 through BD3) each of 32 bytes, each depacketizer block containing one packet,
   a descriptors area (Z.DES) containing four descriptors each of one byte, each descriptor being assigned to one depacketizer block to indicate if the block is full or empty,
   a read pointer area (Z.PTL) with a read pointer of one byte to indicate, in said second read mode, a byte of the depacketizer area,
   a write pointer area (Z.PTE) having a write pointer to indicate, in said second write mode, a block of the depacketizer area in which to write a received packet, and
   a semaphore area (ZS) of one byte to indicate which packetizer area (Z0.C1, Z1.C1) is filled.

3. The synchronous/asynchronous converter according to claims 1 or 2 characterized in that the second port management circuit (APM) is connected to the incoming asynchronous link (LE) by a FIFO type packet memory (M) in which are stored the full packets of the incoming asynchronous link (LE).

* * * * *